United States Patent

Hiji et al.

[11] Patent Number: 5,929,953
[45] Date of Patent: Jul. 27, 1999

[54] LIGHT CONTROL ELEMENT AND METHOD OF MANUFACTURING THE SAME

[75] Inventors: Naoki Hiji, Nakai-machi; Takehito Hikichi; Shigeru Yamamoto, both of Ebina, all of Japan

[73] Assignee: Fuji Xerox Co., Ltd., Tokyo, Japan

[21] Appl. No.: 09/133,410

[22] Filed: Aug. 13, 1998

Related U.S. Application Data

[62] Division of application No. 08/900,774, Jul. 19, 1997, Pat. No. 5,872,609.

[30] Foreign Application Priority Data

Aug. 7, 1996 [JP] Japan .................................. 8-226046

[51] Int. Cl.$^6$ .................................................. G02F 1/1333
[52] U.S. Cl. ................................................ 349/86; 349/92
[58] Field of Search .............................. 349/92, 93, 94, 349/86

[56] References Cited

U.S. PATENT DOCUMENTS 5,204,763  4/1993  Hikmet ........................................ 349/88
5,790,218  8/1998  Koden et al. .............................. 349/92

FOREIGN PATENT DOCUMENTS 4-355424  12/1992  Japan .
5-181403   7/1993  Japan .

OTHER PUBLICATIONS

Tanaka et al, Optimization of Holographic PDLC for Reflective Color Display Applications, 267–270, SID, 1995

Primary Examiner—William L. Sikes
Assistant Examiner—James Dudek
Attorney, Agent, or Firm—Oliff & Berridge, PLC

[57] ABSTRACT

In a light control element whose reflection factor or transmission factor varies in response to an external stimulus such as voltage by having layer structure in which the refractive index varies periodically, design is made such that the difference in refractive index between adjacent layers in a reflected state becomes sufficiently great and the half-amplitude level of reflection spectrum becomes sufficiently high. A light control layer is interposed between supporting plates, and the light control layer is obtained by alternately laminating a nonsensitive layer and a sensitive layer in the Z-axis direction.

In the nonsensitive layer, the oriented direction of the liquid crystal is fixed in the X-axis direction, while in the sensitive layer, the liquid crystal is oriented in the X-axis direction. On the supporting plate, a pair of electrodes and facing to each other in the Y-direction are so formed as to extend in a striped shape in the X-axis direction respectively. When voltage is applied between electrodes, the oriented direction of the liquid crystal in the sensitive layer changes into the Y-axis direction.

2 Claims, 5 Drawing Sheets

(A)

(B)

(A)

(B)

(A)

(B)

(C)

LIGHT CONTROL ELEMENT AND METHOD OF MANUFACTURING THE SAME

This is a Division of application Ser. No. 08/900,774 filed Jul. 25, 1997 U.S. Pat. No. 5,872,609. The entire disclosure of the prior application is hereby incorporated by reference herein in its entirety.

BACKGROUND OF THE INVENTION

1. Field of the Invention

The present invention relates to a light control element whose reflection factor or transmission factor varies in response to an external stimulus such as voltage, and a method of manufacturing the light control element.

2. Description of the Related Art

A light control element having a light control layer whose reflection factor or transmission factor varies in response to an external stimulus such as voltage can be used for light switches for light communication units, light arithmetic units or the like, light bulbs for projection type display units, or back light type or reflection type of direct viewing display units and so forth.

Since it has high utilization efficiency of light and is capable of effecting multi-color light control, particularly a light control element obtained by laminating a plurality of light control layers having different display colors can be suitably used for a reflection type display unit for displaying by using external light and particularly for a reflection type display unit capable of color displaying.

As a light control element whose reflection factor or transmission factor thus varies in response to an external stimulus such as voltage, Japanese Published Unexamined Patent Application No. Hei 4-355424 discloses a light control element obtained by pinching the volume hologram optical film between two sheets of substrates, on each of which an electrode has been formed, in which a liquid crystal is dispersed and held in a cured object matrix, and which has a layer structure in which the refractive index periodically varies within.

This volume hologram optical film generates reflected light of a specified wavelength by its "layer structure in which the refractive index periodically varies" in accordance with the well-known principle of interference filter. Also, since the refractive index of the liquid crystal varies in response to an external field such as voltage, the reflection factor can be controlled from a light transmitted state at a reflection factor of 0% to a light reflected state at a fixed reflection factor by varying the external field.

In this case, as a concrete form of the "layer structure in which the refractive index periodically varies", in the 0010th column and 0011th column of the Japanese Published Unexamined Patent Application No. Hei 4-355424, there are displayed "layer structure in which the content of liquid crystals periodically varies within the film" and "layer structure in which the oriented state of liquid crystals periodically varies within the film".

Also, in the 0017th column of the same Published Unexamined Patent Application, there is described "Since a difference Δn in the refractive index (within one period) relates to the (spectrum) half-amplitude level of diffraction efficiency and diffracted light, the greater the better, and the difference in the refractive index between these layers is set to at least 0.02, preferably 0.05 or more, or particularly preferably 0.10 or more".

Also, in the 0032nd column and 0036th column of the same Published Unexamined Patent Application, as a method of manufacturing volume hologram optical film, there is disclosed a method of periodically separating high polymer molecules by irradiating two light beams of coherence onto mixed liquid consisting of a photo-setting uncured object and a liquid crystal to cure the uncured object along an interference pattern formed by these light beams.

As pointed out also in Japanese Published Unexamined Patent Application No. Hei 5-181403, however, it has conventionally been difficult in the volume hologram optical film to increase the difference in the refractive index between adjacent layers.

In the same Published Unexamined Patent Application, as a method of increasing the difference in the refractive index between adjacent layers, there is disclosed a method, comprising steps of irradiating two light beams of coherence onto mixed liquid consisting of a photo-setting uncured object containing a material indicating the liquid crystal property capable of polymerization reaction and a liquid crystal which does not effect polymerization reaction to cure the uncured object along an interference pattern formed by these light beams, and thereafter, of curing the entire mixed liquid, in which, in either or both of those two steps, an external field such as an electric field or a magnetic field is applied to the mixed liquid.

The method disclosed as the second embodiment in the same Published Unexamined Patent Application will be described in conjunction with FIG. 5. According to this method, as shown in FIG. 5A, mixed liquid 60 consisting of a photo-setting uncured object containing a material indicating the liquid crystal property capable of polymerization reaction and a liquid crystal which does not effect polymerization reaction is first interposed between two substrates 11 and 12 with electrodes 41 and 42 respectively formed. Next, as shown in FIG. 5B, laser light 101, 102 is irradiated onto the mixed liquid 60 from both sides of the substrates 11 and 12 in a state in which voltage is applied between the electrodes 41 and 42. Then, as shown in FIG. 5C, ultraviolet light 103 is irradiated on the entire surface in a state in which no voltage is applied between the electrodes 41 and 42. In this respect, in the first embodiment of the same Published Unexamined Patent Application, there is disclosed a method of applying a magnetic field in place of the electric field.

According to this method, in a light control element thus obtained, in a portion cured when laser light 101, 102 is irradiated in a state in which an electric field is applied, that is, in the layer A shown in FIGS. 5B and C, the liquid crystal cured objects 66 in the high polymer molecule 65 are oriented in the electric field direction, while in a portion cured when ultraviolet light 103 is irradiated in a state in which no electric field is applied, that is, in the layer B shown in FIGS. 5C, the liquid crystal cured objects 66 are oriented at random, therefore, a difference in the refractive index is caused between layers A and B.

In this respect, in the 0041st column of the same Published Unexamined Patent Application, it is described that "it is also possible in two steps to change the oriented direction of the compound showing the liquid crystal property in the respective layers by applying the external field from two different directions". Problems to be solved by the Invention:

Even by the method described in the Japanese Published Unexamined Patent Application No. Hei 5-181403 described above, however, the difference in refractive index between adjacent layers of the light control element obtained does not still become sufficient.

More specifically, assuming the refractive index of the liquid crystal to ordinary light to be "no", and that to extraordinary light to be "ne", if the method described in the same Published Unexamined Patent Application is used, since the liquid crystals are oriented in the electric field direction in layer A shown in FIG. 5C, the refractive index of the layer A becomes "no" while since the liquid crystals are three-dimensionally oriented at random in layer B, the refractive index of the layer B becomes (ne+2no)/3. However, the refractive index of the high polymer molecule portion is ignored.

Accordingly, the difference in refractive index between layers A and B becomes (ne−no)/3, and is only one third the birefringence index (ne−no) of the liquid crystal. This is because the liquid crystals are three-dimensionally oriented at random in the layer B.

Therefore, in the light control element obtained by the method described in the Japanese Published Unexamined Patent Application No. Hei 5-181403, the half-amplitude level of the reflection spectrum during the reflection does not still become sufficiently high, and when used as a reflection type display unit, the lightness and chroma saturation do not still become sufficiently high.

Thus, by having layer structure in which the refractive index periodically varies, the present invention directs, in a light control element whose reflection factor or transmission factor varies in response to an external stimulus such as voltage, and a method of manufacturing it, to make the difference in refractive index between adjacent layers in a reflected state sufficiently great and to make the half-amplitude level of the reflection spectrum sufficiently high.

SUMMARY OF THE INVENTION

According to the present invention for a light control element, the light control element has a light control layer having a light control layer obtained by alternately laminating a first optical medium layer and a second optical medium layer;

each of said first optical medium layer and said second optical medium layer is an aggregate of a uniaxial optical medium;

the light control layer is transitionable between a first state and a second state in conformity to the presence or absence, or the degree of an external stimulus;

in the first state, the optical main axis direction within the first optical medium layer and that within the second optical medium layer are orthogonal to each other within a X-Y plane perpendicular to a Z-axis direction which is a lamination direction of the first and second optical medium layers; and in the second state, the optical main axis direction within the first optical medium layer and that within the second optical medium layer are set to the same direction.

Also, as the invention for a method of manufacturing light control elements, there are provided a step of uniformly orienting the liquid crystal in a liquid layer consisting of liquid crystal mixed liquid prepared by mixing a photo-setting uncured object and a liquid crystal by means of oriented film in contact with the liquid layer; and a step of irradiating two light beams of coherence onto the liquid layer to cure the uncured object along an interference pattern formed by those two light beams.

In another invention for a method of manufacturing light control elements, two light beams of coherence are irradiated onto liquid crystal mixed liquid prepared by mixing a photo-setting multifunctional uncured object and a liquid crystal to cause crosslinking reaction along the interference pattern formed by those two light beams.

The liquid crystal oriented in one direction indicates a typical example of uniaxial optical medium, and in this case, the optical main axis direction of an optical medium layer consisting of an aggregate of a uniaxial optical medium may be considered to be the same as the oriented direction of the liquid crystal. Not only liquid crystals whose crystallization point group has uniaxial symmetry property such as a nematic liquid crystal and a smectic A liquid crystal, but also liquid crystals whose principal values of refractive index n1, n2 and n3 satisfy a relation of n1 ≠n2 to n3 although the crystallization point group is biaxial, such as a smectic C liquid crystal can be actually regarded as uniaxial.

When a liquid crystal is used as an uniaxial optical medium, in a light control element, constructed as described above, according to the first aspect of the invention, the liquid crystal within the first optical medium layer and the liquid crystal within the second optical medium layer are oriented, in the first state of the light control layer, in such a direction that they are orthogonal to each other within the X-Y plane.

Accordingly, assuming the refractive index of the liquid crystal to ordinary light to be "no", and that to extraordinary light to be "ne", the difference in refractive index between the first optical medium layer and the second optical medium layer in the first state becomes substantially equal to the birefringence index (ne−no) of the liquid crystal, and becomes substantially three times the difference in refractive index (ne−no)/3 between layers A and B shown in FIG. 5C in a light control element obtained by the method described in the Japanese Published Unexamined Patent Application No. Hei 5-181403 described above.

In the first state, therefore, a great difference in refractive index is caused between the first and second optical medium layers, generating reflected light having sufficiently high half-amplitude level of reflection spectrum.

And yet, in the first state, since the oriented direction of the liquid crystal in the first optical medium layer and the oriented direction of the liquid crystal in the second optical medium layer are orthogonal to each other within the X-Y plane, reflection is also caused for polarized light having a vibratory plane in each direction of the X-axis and Y-axis, and the peak value of the reflection factor also become high because they have no polarization dependence on incident light which is incident in the Z-axis direction.

In this respect, in the second state of the light control layer, the liquid crystal in the first optical medium layer and the liquid crystal in the second optical medium layer are oriented in the same direction, i.e., in the X-axis direction, Y-axis direction or Z-axis direction respectively, and therefore, no difference in refractive index is caused between the first optical medium layer and the second optical medium layer, and the light control layer does not cause any reflected light.

The orientation in the first optical medium layer and the orientation in the second optical medium layer are desirably orthogonal discontinuously from an idealistic viewpoint, but they actually vary continuously to some degree. Even in that case, however, the same effect as described above can be obtained. However, such a spiral structure as cholesteric liquid crystal in which the orientation varies continuously is not desirable because it causes circular dichroism in the reflection factor.

Even when any other than the liquid crystal is used as a uniaxial optical medium, the half-amplitude level of reflection spectrum in a reflected state becomes high due to a similar action.

In a light control element of one form when the liquid crystal is used as a uniaxial optical medium, in a state in which no external stimulus is applied to the light control layer, the liquid crystal in the first optical medium layer and the liquid crystal in the second optical medium layer are oriented in the same direction of the X-axis direction or the Y-axis direction, no difference in refractive index is caused between the first optical medium layer and the second optical medium layer, and the light control layer causes no reflected light. On the other hand, in a state in which an external stimulus is applied to the light control layer, the liquid crystal in the first optical medium layer and the liquid crystal in the second optical medium layer are oriented in such a direction that they are orthogonal to each other within the X-Y plane, a great difference in refractive index is caused between the first optical medium layer and the second optical medium layer, and the light control layer causes reflected light of a sufficiently high half-amplitude level of reflection spectrum.

Similarly, in a light control element of one form when the liquid crystal is used as a uniaxial optical medium, in a state in which no external stimulus is applied to the light control layer, the liquid crystal in the first optical medium layer and the liquid crystal in the second optical medium layer are oriented in such a direction that they are orthogonal to each other within the X-Y plane, a great difference in refractive index is caused between the first optical medium layer and the second optical medium layer, and the light control layer causes reflected light of a sufficiently high half-amplitude level of reflection spectrum. On the other hand, in a state in which an external stimulus is applied to the light control layer, the liquid crystal in the first optical medium layer and the liquid crystal in the second optical medium layer are oriented in the Z-axis direction, no difference in refractive index is caused between the first optical medium layer and the second optical medium layer, and the light control layer causes no reflected light.

The "layer structure in which the refractive index periodically varies" of the conventional light control element is formed by a high polymer molecule produced by photo-setting being phase-separated from the liquid crystal. In this case, in order to make the difference in refractive index between layers great, it is desirable that the liquid crystal layer is clearly separated from the high polymer molecule layer. If, however, the diameter of a liquid crystal droplet separated in the high polymer molecule matrix is not sufficiently smaller than the pitch of the layer, the liquid crystal droplets themselves within adjacent layers adhere to one another not to form any definite periodic structure. On the other hand, if the diameter of the liquid crystal droplet is sufficiently smaller than the pitch of the layer, the liquid crystal droplets themselves do not adhere to one another, but the volume ratio of the liquid crystal contained in the liquid crystal layer cannot be made higher than the closest packing ratio (=64%) of a sphere. For such a reason, a sufficiently great difference in refractive index could not be obtained in the layer structure in which the high polymer molecule and the liquid crystal are phase-separated.

In contrast, a light control layer of another form is formed by anisotropic gel. The anisotropic gel is high-molecular gel containing a low-molecular liquid crystal in a liquid crystal high-molecular matrix crosslinked. Since it is possible to obtain anisotropic gel containing 90% or more of liquid crystal comparatively easily, it becomes possible to increase the ratio of liquid crystal contained in the light control layer. And yet, such an anisotropic gel can be optically regarded as uniaxial to thereby obtain a light control element according to the first, second and fifth aspects of the invention. In this respect, as reticulate-shaped high polymer molecule constituting the anisotropic gel, the liquid crystal high polymer molecule can be suitably utilized from the viewpoint of more uniform orientation being obtained.

According to this form, a periodic structure which causes a difference in refractive index can be formed by the formation of structure in which the response property to the external field periodically varies by means of a method such as a method of periodically varying the crosslinking density or a method of periodically combining molecules having different response property to the external field. In the anisotropic gel, periodic variations in refractive index can be obtained without utilizing the phase separation between high polymer molecule and liquid crystal, and therefore, a great difference in refractive index can be obtained without being restricted by the above-described concerning the difference in refractive index.

When mixed liquid consisting of a photo-setting uncured object and a liquid crystal is exposed by means of two light beams of coherence, orientation control using oriented film has conventionally been found difficult generally because of a large number of restrictions. According to the manufacturing method of the present invention, however, it is possible to easily control the orientation using oriented film by converting the mixed liquid consisting of a photo-setting uncured object and a liquid crystal into one having the liquid crystal property. By effecting the orientation control using this method, a light control element according to the present invention can be easily obtained.

According to the invention on a method of manufacturing light control elements when the light control layer is formed by anisotropic gel, two light beams of coherence are irradiated onto liquid crystal mixed liquid prepared by mixing a photo-setting multifunctional uncured object and a liquid crystal, whereby crosslinking reaction is caused along an interference pattern formed by those two light beams to prepare anisotropic gel. In order to prepare the anisotropic gel, it is necessary to produce a liquid crystal high polymer molecule after the multifunctional uncured object reacts to light. In order to meet the necessity, itself can suitably utilize the multifunctional uncured object having the liquid crystal property. Therefore, according to this method, it is possible to easily form anisotropic gel in which the orientation is periodically fixed.

DETAILED DESCRIPTION OF PREFERRED EMBODIMENTS

[First Embodiment . . . (FIG. 1)]

Figure 1:
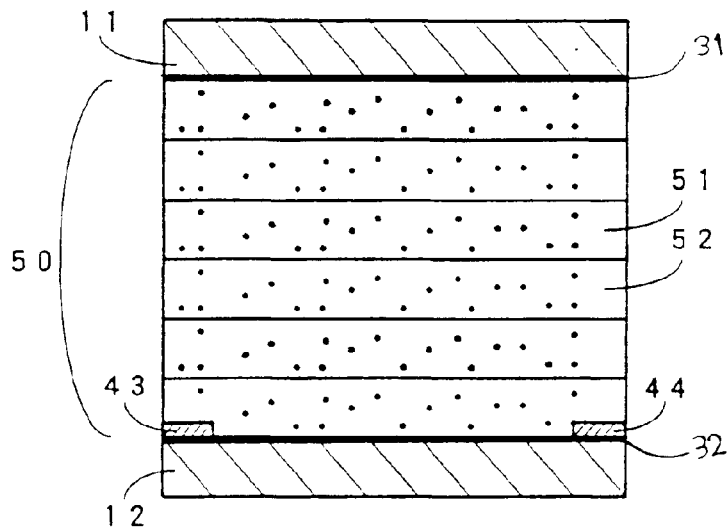
FIG. 1 is a sectional view showing a first embodiment of a light control element according to the present invention.
Figure 1:
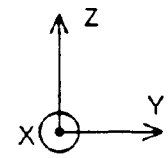
Figure 1:
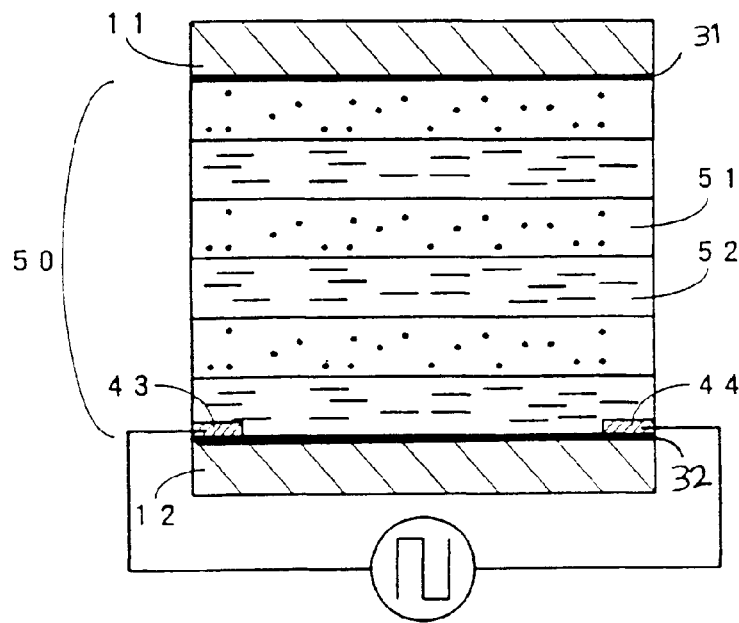

FIG. 1 shows a first embodiment of a light control element according to the present invention, and as shown in the figure, a direction perpendicular to the space is regarded as a X-axis direction, the lateral direction in the figure, a Y-axis direction, and the vertical direction therein, a Z-axis direction.

In a light control element of this embodiment, a light control layer 50 is interposed between supporting plates 11 and 12, such that it is obtained by alternately laminating a non-sensitive layer 51 and a sensitive layer 52 in the Z-axis direction as described later, and such that on the supporting plate 12, a pair of electrodes 43 and 44 facing to each other in the Y-axis direction are so formed as to extend in a striped shape in the X-axis direction respectively.

The light control layer 50 is formed of anisotropic gel containing an oriented liquid crystal containing a nematic liquid crystal (hereinafter, referred to as Np liquid crystal) having positive dielectric anisotropy such that liquid crystal molecules are oriented in the X-axis direction as indicated by dots in FIG. 1A. And yet, the crosslinking density of gel is periodically varied in the Z-axis direction in the light control layer 50, whereby a non-sensitive layer 51 which does not respond to voltage is formed in a high crosslinking density area while in a low crosslinking density area, a sensitive layer 52 which comparatively easily responds to voltage is formed.

In the light control element of this embodiment, in astate in which no voltage is applied between electrodes 43 and 44, the liquid crystal molecules in the light control layer 50 are uniformly oriented in the X-axis direction both in the non-sensitive layer 51 and in the sensitive layer 52 as shown in FIG. 1A, and therefore, no difference in refractive index is caused between the nonsensitive layer 51 and the sensitive layer 52, thus causing no reflected light.

In contrast, in a state in which voltage is applied between electrodes 43 and 44, an electric field is applied to the light control layer 50 in the Y-axis direction as shown in FIG. 1B, whereby the oriented direction of the liquid crystal molecules in the sensitive layer 52 changes into the Y-axis direction. This causes a difference in refractive index between the nonsensitive layer 51 and the sensitive layer 52, in other words, a periodic change in refractive index is caused in the light control layer 50 in the Z-axis direction, thus causing reflected light.

A light control element of this embodiment is manufactured by the following method as an example: first, supporting plates 11 and 12 consisting of glass respectively are prepared, electrode material such as Al is formed as the film on the supporting plate 12, and is patterned to form the electrodes 43 and 44. Next, the supporting plates 11 and 12 are coated with oriented film 31 and 32 such as polyimide and are rubbed with cloth in one direction, that is, so-called rubbing process is effected.

Next, a spacer for keeping a constant spacing between the supporting plates 11 and 12 is interposed therebetween, and they are pasted together so that their rubbing directions are parallel to prepare a cell. Then, a multifunctional compound having the liquid crystal property, a photopolymerization initiator and a liquid crystal having no polymerizability are mixed to prepare mixed liquid having the liquid crystal property, which will be poured into the cell.

Next, Ar ion laser light having a wavelength of 488 nm is divided into two light beams, and these two light beams are irradiated onto the cell surface perpendicularly from the front and rear sides thereof. This irradiation causes these two light beams to form an interference band in parallel to the X-Y plane in the mixed liquid, and the multifunctional compound effects polymerization reaction in a light portion of the interference band, that is, gels to be consumed. Along with the consumption, the multifunctional compound diffuses from a dark portion of the interference band to the light portion to form a high crosslinking density area, that is, the nonsensitive layer 51.

After predetermined exposure time, ultraviolet light is irradiated onto the entire cell to cause the remaining multifunctional compound to react. Thus, the crosslinking density periodically varies in the Z-axis direction and a light control layer 50 structured to have the nonsensitive layer 51 and the sensitive layer 52 can be obtained.

An example of the composition of the mixed liquid is as follows:

(1) Multifunctional compound having liquid crystal property 1,4-phenylene bis {4-[6-(acryloxyl-oxy)hexyloxy] benzoate} 5%

(2) Photopolymerization initiator CGI-784 (produced by Chiba Geigi, Inc.) 1%

(3) Liquid crystal having no polymerizability E7 (produced by Merck, Inc.) 94%

As the multifunctional compound, free-radical polymerizable or ion polymerizable compounds such as acryl, methacryl, acrylamide and epoxy can be suitably utilized. Also, not only the bifunctional but also trifunctional, or further multifunctional ones may be used. Also, in order to impart the liquid crystal property to the multifunctional compound, it is normally desirable to include structure for imparting skeleton structure of liquid crystal such as biphenyl, terphenyl, azobenzene, azomethine, phenyl benzoate, phenyl cyclohexane and phenyl pyrimidine.

As the photopolymerization initiator, there can be utilized well-known photopolymerization initiators such as benzoyn, benzoyn ether and benzoyn ketal which are cleavage type photopolymerization initiators; benzyl, benzophenone and Michler's keton which are hydrogen drawing type photopolymerization initiators; and aryl di-azonium-fluoro borate which is an ionic reaction type photopolymerization initiator. Also, to shorten the exposure time, a sensitization agent may be added.

As the liquid crystal, there can be suitably used a well-known liquid crystal consisting of a low-molecular compound having liquid crystal skeleton structure.

The mixed liquid, however, may be such that it can have the liquid crystal property before polymerization and fix the orientation before irradiation by means of optical irradiation. Generally, although of the above-described composition, the photopolymerization initiator and the liquid crystal having no polymerizability cannot be dispensed with, a multifunctional compound having the liquid crystal property need not always be used, but for example, a multifunctional compound having no liquid crystal property may be contained by several percents in the mixed liquid. Also, in addition to the above-described composition, a single-functional compound having the liquid crystalline property, liquid crystalline binder polymer or liquid crystalline oligomer may be contained. In order to increase the thermal stability with the passage of time, however, it is better to form anisotropic gel by adding a multifunctional compound.

The nonsensitive layer 51 needs not be one which does not respond to any voltage, but it is preferable that it is sufficiently different from the sensitive layer 52 in the response characteristics to the external field, such as, for example, one which reacts to a sufficiently higher voltage than voltages to which the sensitive layer 52 reacts or one whose response speed to voltage is noticeably slower than that of the sensitive layer 52.

A liquid crystal was actually prepared on condition that the composition of the mixed liquid and the wavelength of laser light are set to the above-described respectively, and a spacing between electrodes 43 and 44 is set to 100 μm. When no voltage was applied between electrodes 43 and 44, no reflected light was observed. When, however, a symmetrical amplitude square wave of 100 Hz was applied between electrodes 43 and 44, a reflection spectrum having a peak at about 490 nm was obtained. Also, as the applied voltage was raised, the reflection factor increased, and a maximum reflection factor 80% was obtained at about 70 V. When the applied voltage was further increased, the reflection factor decreased.

According to the first embodiment, firstly, in a reflected state in which voltage is applied between the electrodes 43 and 44 as shown in FIG. 1B, the liquid crystal in the nonsensitive layer 51 is oriented in the X-axis direction while the liquid crystal in the sensitive layer 52 is oriented in the Y-axis direction, and therefore, the difference in refractive index between the nonsensitive layer 51 and the sensitive layer 52 is as very great as substantially equal to the birefringence index (ne–no) of the liquid crystal, and a sufficiently high half-amplitude level of reflection spectrum can be obtained.

Secondly, in the reflected state, reflection is caused for any polarized light having a vibratory plane in each direction of the X-axis and Y-axis, and it has no polarization dependence on incident light which is incident in the Z-axis direction, and therefore, the peak value of the reflection factor also becomes high.

Thirdly, since it is formed of anisotropic gel containing a liquid crystal oriented, the light control layer 50 has low viscosity and becomes capable of responding at high speeds.

Fourthly, since there exists no transparent electrode such as ITO film at the opening, it is excellent in optical transmission, and does not cause any unnecessary reflection. Also, since one of supporting plates 11 needs no electrode, a small number of man-hour for processing electrodes is required.

Fifthly, while reflected light is caused when no voltage is applied in a conventional light control element, a transparent state can be obtained when no voltage is applied on the contrary according to a light control element of the first embodiment. Accordingly, it can be suitably used for the use application in which it preferably becomes transparent at the normal condition in which no voltage is applied such as, for example, light control for an automotive windshield.

[Second Embodiment . . . (FIG. 2)]

Figure 2:
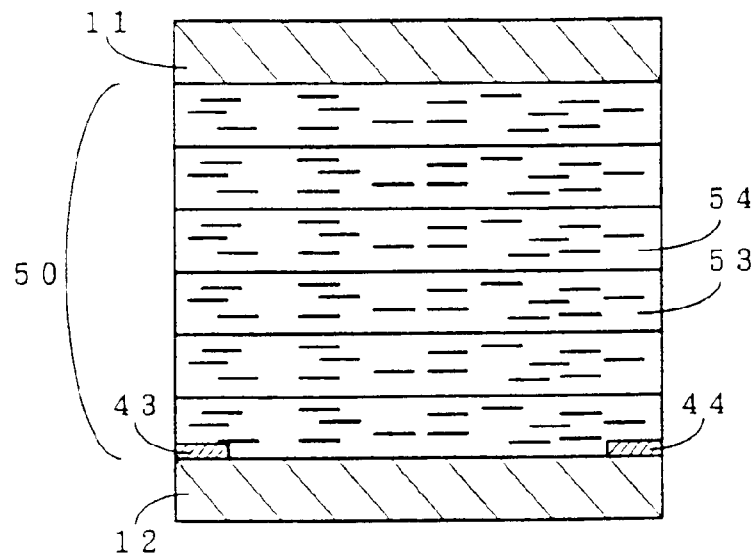
FIG. 2 is a sectional view showing a second embodiment of a light control element according to the present invention.
Figure 2:
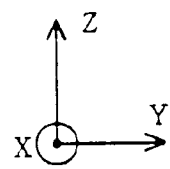
Figure 2:
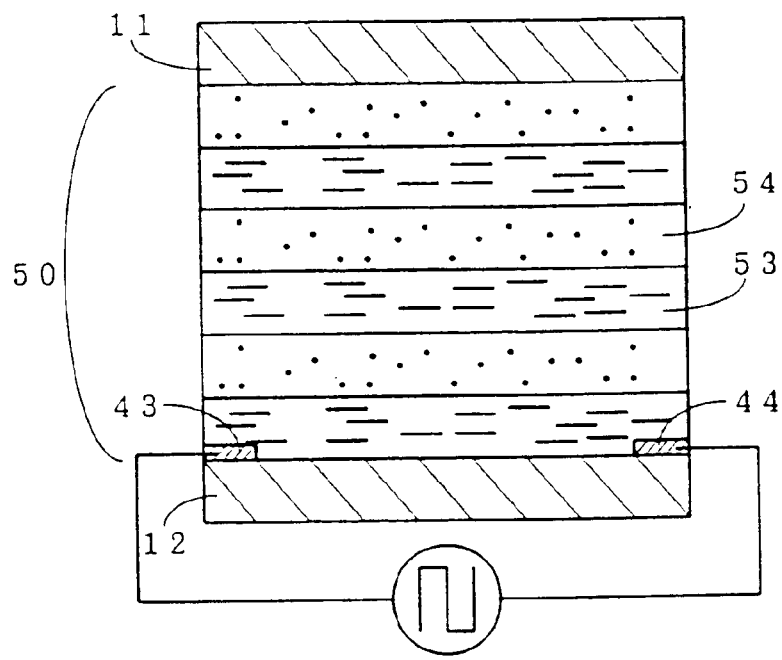

FIG. 2 shows a second embodiment of a light control element according to the present invention, and as shown in the figure, a direction perpendicular to the space is regarded as a X-axis direction, the lateral direction in the figure, a Y-axis direction, and the vertical direction therein, a Z-axis direction.

Also in a light control element of this embodiment, the light control layer 50 is interposed between supporting plates 11 and 12 such that it is obtained by alternately laminating a nonsensitive layer 53 and a sensitive layer 54 in the Z-axis direction as described later, and such that on the supporting plate 12, a pair of electrodes 43 and 44 facing to each other in the Y-axis direction are so formed as to extend in a striped shape in the X-axis direction respectively.

In this embodiment, however, the light control layer 50 is formed of anisotropic gel containing an oriented liquid crystal containing a nematic liquid crystal (hereinafter, referred to as Nn liquid crystal) having negative dielectric anisotropy such that liquid crystal molecules are oriented in the Y-axis direction as indicated by bars in FIG. 2A. In the light control layer 50, the crosslinking density of gel is periodically varied in the Z-axis direction, whereby a nonsensitive layer 53 which does not respond to voltage is formed in a high crosslinking density area while in a low crosslinking density area, a sensitive layer 54 which comparatively easily responds to voltage is formed. In this respect, this is the same as the first embodiment.

In the light control element of this embodiment, in a state in which no voltage is applied between electrodes 43 and 44, the liquid crystal molecules in the light control layer 50 are uniformly oriented in the Y-axis direction both in the nonsensitive layer 53 and in the sensitive layer 54 as shown in FIG. 2A, and therefore, no difference in refractive index is caused between the nonsensitive layer 53 and the sensitive layer 54, thus causing no reflected light.

In contrast, in a state in which voltage is applied between electrodes 43 and 44, an electric field is applied to the light control layer 50 in the Y-axis direction as shown in FIG. 2B, whereby the oriented direction of the liquid crystal molecules in the sensitive layer 54 changes into the X-axis direction. This causes a difference in refractive index between the nonsensitive layer 53 and the sensitive layer 54, in other words, a periodic variation in refractive index is caused in the Z-axis direction in the light control layer 50, thus causing reflected light.

The light control element of this embodiment can be manufactured by the same method as the first embodiment with the exception that the Nn liquid crystal is used in place of the Np liquid crystal. An example of the composition of the mixed liquid is as follows:

(1) Multifunctional compound having liquid crystal property 1,4-phenylene bis {4-[6-(acryloxyl-oxy)hexyloxy]benzoate}5%

(2) Photopolymerization initiator CGI-784 (produced by Chiba Geigi, Inc.) 1%

(3) Liquid crystal having no polymerizability ZLI-1623 (produced by Merck, Inc.) 94%

A liquid crystal was actually prepared on condition that the composition of the mixed liquid is set to the above-described one, that for the laser light for irradiating the mixed liquid, Ar ion laser light having a wavelength of 488 nm is used, and that a spacing between electrodes 43 and 44 is set to 100 μm. When no voltage was applied between electrodes 43 and 44, no reflected light was observed. When, however, a symmetrical amplitude square wave of 100 Hz was applied between electrodes 43 and 44, a reflection spectrum having a peak at about 490 nm was obtained. Also, as the applied voltage is raised, the reflection factor increased, and a maximum reflection factor 80% was obtained at about 70 V. When the applied voltage was further increased, the reflection factor decreased.

In a light control element of the first embodiment, in a reflected state in which voltage is applied between electrodes 43 and 44 as shown in FIG. 1B, an area with a low reflection factor arises in the vicinity of the electrodes 43 and 44. This is supposedly because an electric force line does not run parallel to the Y-axis in the vicinity of the electrodes 43 and 44, but the liquid crystal in the sensitive layer 52 is oriented in the direction of the electric force line which does not run parallel to its Y-axis.

In contrast, in a light control element of the second embodiment, in a reflected state in which voltage is applied between electrodes 43 and 44 as shown in FIG. 2B, the reflection factor shows a fixed value between electrodes 43 and 44. More specifically, according to the second embodiment, when no voltage is applied between electrodes 43 and 44 as shown in FIG. 2A, the Nn liquid crystal is caused to be oriented in the Y-axis direction, whereby it is possible to obtain uniform orientation even in an area in which the electric force line near the electrodes 43 and 44 does not run parallel to the Y-axis when voltage is applied between the electrodes 43 and 44 as shown in FIG. 2B, resulting in uniform reflection factor distribution within the pixel. According to the second embodiment, the same effect as the first embodiment can be obtained in addition.

[Third Embodiment . . . (FIG. 3)]

Figure 3:
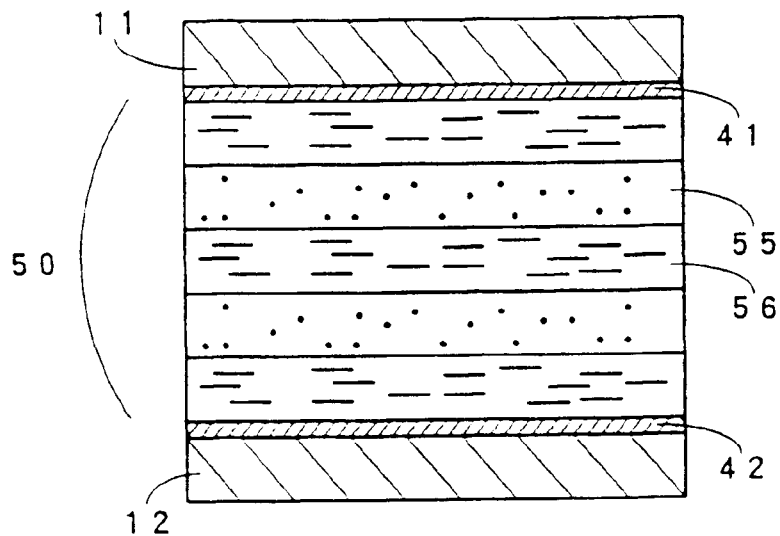
FIG. 3 is a sectional view showing a third embodiment of a light control element according to the present invention.
Figure 3:
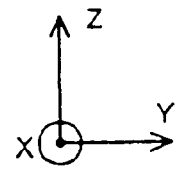
Figure 3:
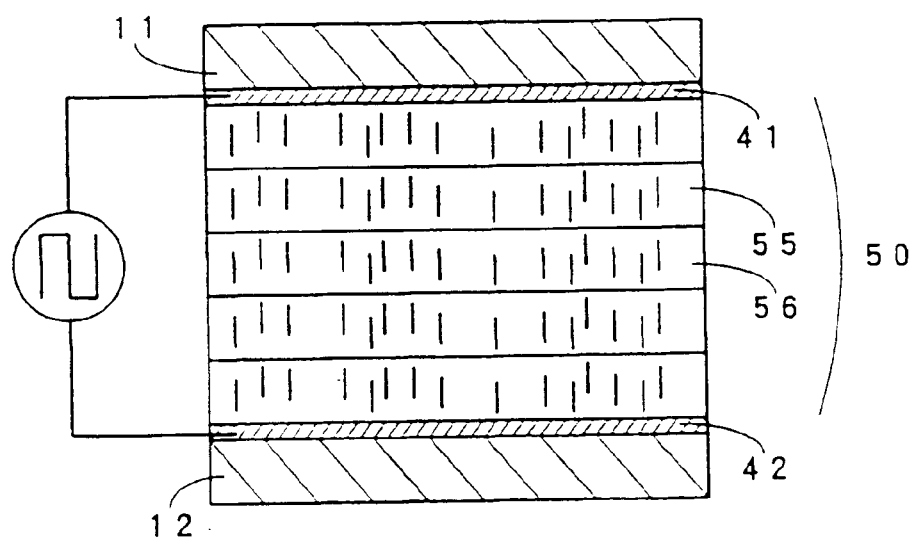

FIG. 3 shows a third embodiment of a light control element according to the present invention, and as shown in the figure, a direction perpendicular to the space is regarded as a X-axis direction, the lateral direction in the figure, a Y-axis direction, and the vertical direction therein, a Z-axis direction.

In a light control element of this embodiment, a light control layer 50 is interposed between a supporting plate 11 on which the electrode 41 is formed and a supporting plate 12 on which the electrode 42 is formed, such that it is formed of anisotropic gel containing an oriented liquid crystal containing Np liquid crystal and such that a first layer 55 whose orientation is fixed in the X-axis direction and a second layer 56 whose orientation is fixed in the Y-axis direction are alternately laminated in the Z-axis direction as shown in FIG. 3A.

In the light control element of this embodiment, in astate in which no voltage is applied between electrodes 41 and 42, the liquid crystal molecules in the light control layer 50 are oriented in the X-axis direction in a first layer 55 and also are oriented in the Y-axis direction in a second layer 56 as shown in FIG. 3A, and therefore, a difference in refractive index is caused between the first layer 55 and the second layer 56, in other words, a periodic variation in the refractive index is caused in the Z-axis direction in the light control layer 50, causing reflected light.

In contrast, in a state in which voltage is applied between electrodes 41 and 42, an electric field is applied to the light control layer 50 in the Z-axis direction as shown in FIG. 3B, whereby the oriented direction of the liquid crystal molecules in the first layer 55 and the oriented direction of the liquid crystal molecules in the second layer 56 change into the Z-axis direction respectively. This loses the difference in refractive index between the first layer 55 and the second layer 56, and the reflected light disappears.

A light control element of this embodiment is, as an example, manufactured by the following method: first, translucent electrode material such as ITO is first formed as the film on supporting plates 11 and 12 consisting of glass to form electrodes 41 and 42. Next, the electrodes 41 and 42 are coated with oriented film such as polyimide although omitted in the figure, and it is rubbed with cloth in one direction; a so-called rubbing process is performed.

Next, a spacer for keeping a constant spacing between the supporting plates 11 and 12 is interposed therebetween, and they are pasted together so that their rubbing directions are parallel to prepare a cell. Then, a multifunctional compound having the liquid crystal property, a photopolymerization initiator and a liquid crystal having no polymerizability are mixed to prepare mixed liquid having the liquid crystal property, which will be poured into the cell. At this time, the liquid crystal of the liquid crystal mixed liquid is uniformly oriented in the cell in the rubbing direction. Hereinafter, this direction will be represented by the Y-axis direction.

Next, Ar ion laser light having a wavelength of 488 nm is divided into two light beams, and these two light beams are irradiated perpendicularly onto the cell surface from the front and rear sides of the cell. This irradiation causes these two light beams to form an interference band in parallel to the X-Y plane in the mixed liquid, and the multifunctional compound effects polymerization reaction in a light portion of the interference band, that is, gels, and the oriented direction of the liquid crystal in that portion is fixed in the Y-axis direction.

Next, a magnetic field is applied in the X-axis direction using a superconductive magnet. Since the application of the magnetic field causes reflected light due to interference, the strength of the magnetic field is so adjusted as to make the intensity of this reflected light maximum. In this state, ultraviolet light is irradiated onto the entire cell.

When an element was actually manufactured by the foregoing method, the reflected light did not disappear even if the magnetic field was removed after the irradiation of ultraviolet light. This is supposedly because in a state in which the magnetic field is applied in the X-axis direction, the liquid crystal is oriented in the Y-axis direction in a portion gelled, while the liquid crystal is oriented in the X-axis direction in a portion not gelled, and those oriented states are fixed by the irradiation of ultraviolet light to obtain such structure as shown in FIG. 3A. As the mixed liquid, one having the same composition as used in the first embodiment was used.

According to the third embodiment, firstly, in a reflected state in which no voltage is applied between the electrodes 41 and 42 as shown in FIG. 3A, the liquid crystal in the first layer 55 is oriented in the X-axis direction while the liquid crystal in the second layer 56 is oriented in the Y-axis direction, and therefore, the difference in refractive index between the first layer 55 and the second layer 56 is as very great as substantially equal to the birefringence index (ne–no) of the liquid crystal, and a sufficiently high half-amplitude level of reflection spectrum can be obtained.

Secondly, in the reflected state, reflection is caused for any polarized light having a vibratory plane in each direction of the X-axis and Y-axis, and it has no polarization dependence on incident light which is incident in the Z-axis direction, and therefore, the peak value of the reflection factor also becomes high.

Thirdly, since it is formed of anisotropic gel containing a liquid crystal oriented, the light control layer 50 has low viscosity and becomes capable of responding at high speeds.

Fourthly, the light control layer 50 is capable of increasing the strength of the electric field more than in the first and second embodiments at the same applied voltage, and becomes capable of high-speed driving at low voltages.

[Fourth Embodiment . . . (FIG. 4)]

Figure 4:
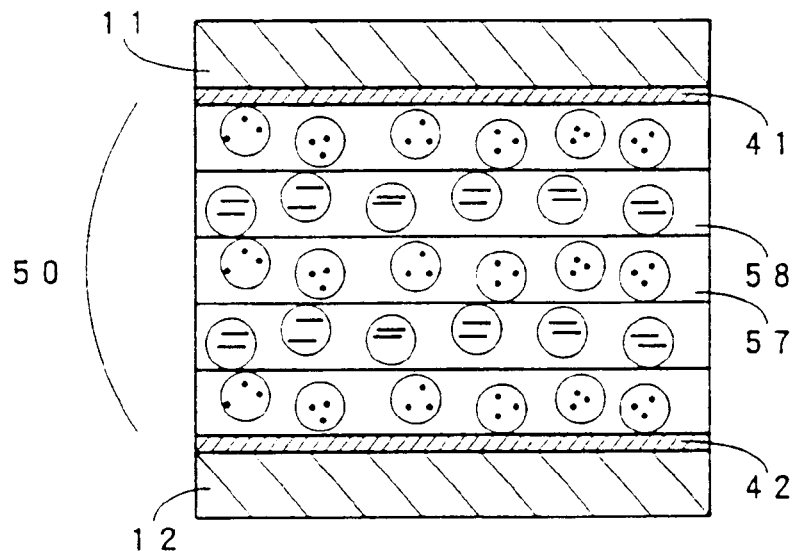
FIG. 4 is a sectional view showing a fourth embodiment of a light control element according to the present invention.
Figure 4:
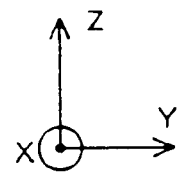
Figure 4:
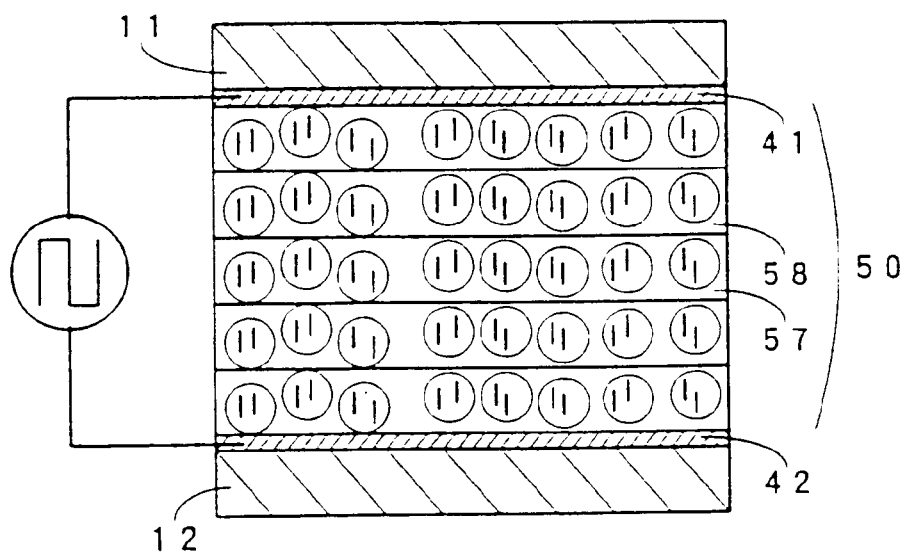

FIG. 4 shows a fourth embodiment of a light control element according to the present invention, and as shown in the figure, a direction perpendicular to the space is regarded as a X-axis direction, the lateral direction in the figure, a Y-axis direction, and the vertical direction therein, a Z-axis direction.

In a light control element of this embodiment, a light control layer 50 is interposed between a supporting plate 11 on which the electrode 41 is formed and a supporting plate 12 on which the electrode 42 is formed, such that it is formed of liquid crystal high-molecular composite material in which the droplets of Np liquid crystal are dispersed and held in high-molecular matrix, and such that a first layer 57 in which the orientation of the liquid crystal within the droplets is fixed in the X-axis direction and a second layer 58 in which the orientation of the liquid crystal within the droplets is fixed in the Y-axis direction are alternately laminated in the Z-axis direction as shown in FIG. 4A.

In the light control element of this embodiment, in a state in which no voltage is applied between electrodes 41 and 42, the liquid crystal molecules in droplets in the light control layer 50 are oriented in the X-axis direction in the first layer 57 and also are oriented in the Y-axis direction in the second layer 58 as shown in FIG. 4A, and therefore, a difference in refractive index is caused between the first layer 57 and the second layer 58, in other words, a periodic variation in the refractive index is caused in the Z-axis direction in the light control layer 50, causing reflected light due to interference.

In contrast, in a state in which voltage is applied between electrodes 41 and 42, an electric field is applied to the light control layer 50 in the Z-axis direction, whereby the oriented direction of the liquid crystal molecules within droplets in the first layer 57 and the oriented direction of the liquid crystal molecules within droplets in the second layer 58 change into the Z-axis direction respectively as shown in FIG. 4B. This loses the difference in refractive index between the first layer 57 and the second layer 58, and the reflected light disappears.

A light control element of this embodiment is, as an example, manufactured by the following method: first, translucent electrode material such as ITO is first formed as the film on supporting plates 11 and 12 consisting of glass to form electrodes 41 and 42.

Next, the following steps (1) to (4) are repeated ten times on the supporting plate 12 on which the electrode 42 is formed to form a light control layer 50.

(1) The supporting plate 12 is spin-coated with mixed liquid consisting of a photo-setting uncured object, a liquid crystal and solvent to volatilize the solvent.

(2) This is transferred into a chamber of nitrogen atmosphere, and ultraviolet light is irradiated on the entire supporting plate 12 while applying a magnetic field in the X-axis direction using a superconductive magnet.

(3) The supporting plate 12 is spin-coated with the above-described mixed liquid to volatilize the solvent.

(4) This is transferred into a chamber of nitrogen atmosphere, and ultraviolet light is irradiated onto the entire supporting plate 12 while applying a magnetic field in the Y-axis direction using a superconductive magnet.

The thickness of one layer of the liquid crystal high molecular composite material after cured is so caused as to become about 80 nm. Finally, the supporting plate 11 on which the electrode 41 is formed is pasted on the light control layer 50.

As the photo-setting uncured object, a composition of monomer, oligomer and a photopolymerization initiator can be suitably used. As the above-described monomer, free-radical polymerizable or ion polymerizable compounds such as acryl, methacryl, acrylamide and epoxy can be suitably utilized. For these, the single functional compounds, multi-functional compounds or these mixtures can be used. As the above-described oligomer, polyester acrylate, polyepoxy acrylate, polyurethane acrylate and so forth can be suitably utilized. As the photopolymerization initiator, the same one as in the first embodiment can be used. According to the fourth embodiment, the difference in refractive index between the first layer 57 and the second layer 58 in the reflected state becomes very great, and a sufficiently high half-amplitude level of reflection spectrum can be obtained, and by continuously varying the thickness of each layer, it is also possible to obtain a further higher half-amplitude level of reflection spectrum. Also, since it has no polarization dependence on the incident light, the peak value of the reflection factor also becomes high.

[Comparisons with Comparative Examples in Each Embodiment]

Figure 5:
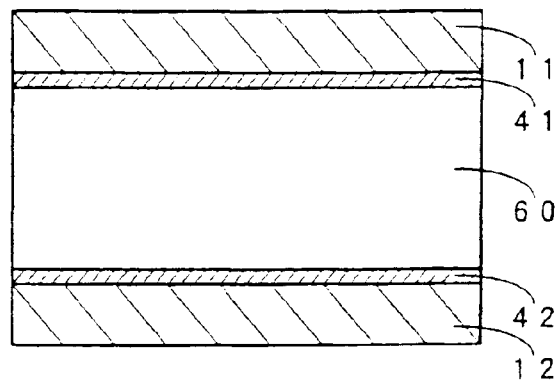
FIG. 5 is a sectional view showing an embodiment of a conventional light control element in order of the manufacturing step.
Figure 5:
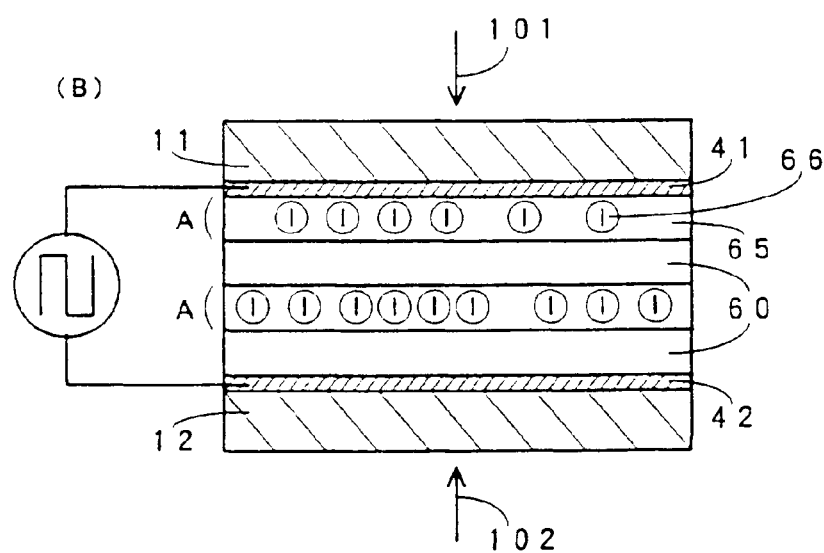
Figure 5:
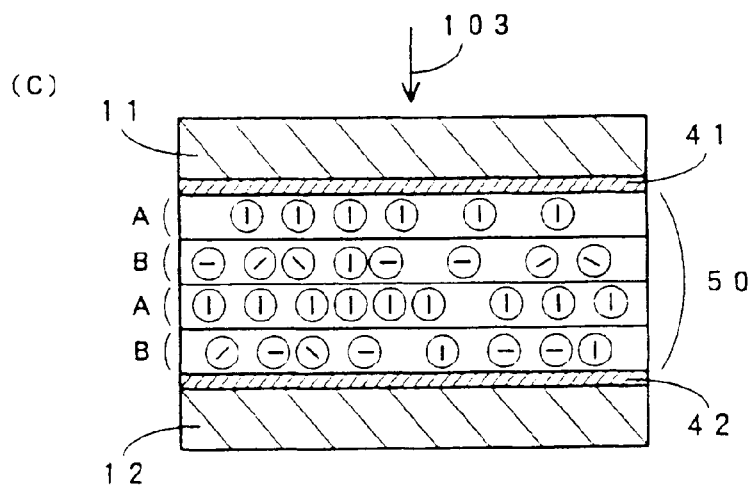

A light control element having the structure shown in FIG. 5C was manufactured by the following method. First, as shown in FIG. 5A, mixed liquid 60 consisting of a photo-setting uncured object and a liquid crystal which does not effect polymerization reaction is interposed between supporting plates 11 and 12 on which electrodes 41 and 42 are formed respectively. Next, laser light 101 and 102 is irradiated while applying voltage between electrodes 41 and 42. Then, ultraviolet light 103 is irradiated on the entire surface without voltage applied.

Concretely, as the photo-setting uncured object, NOA65 produced by Norland, Inc. was used, and as the liquid crystal which does not effect polymerization reaction, a nematic liquid crystal composition E7 produced by Merck, Inc. was used.

The light control element thus manufactured has a reflection spectrum having a peak at about 490 nm, a reflection factor of 70% and a half-amplitude level of reflection spectrum of 10 nm. Also, when a symmetrical amplitude square wave of 100 Hz and 100 Vpp was applied between electrodes 41 and 42, the reflected light disappeared.

In contrast, as regards light control elements of the first, third and fourth embodiments using the Np liquid crystal in the same manner as the above-described comparative examples, their reflection spectra were measured. However, any of them was manufactured by the concrete embodiments described above.

According to the result, a light control element of the first embodiment had a reflection factor of 70% and a half-amplitude level of reflection spectrum of 50 nm, a light control element of the third embodiment had a reflection factor of 70% and a half-amplitude level of reflection spectrum of 50 nm, and a light control element of the fourth embodiment had a reflection factor of 60% and a half-amplitude level of reflection spectrum of 40 nm. In other words, according to the first, third or fourth embodiment, the half-amplitude level of reflection spectrum becomes four to five times although there is not much difference in reflection factor as compared with the comparative examples.

As described above, according to the present invention, the difference in refractive index between adjacent layers in the reflected state becomes sufficiently great, and the half-amplitude level of reflection spectrum becomes sufficiently high.

What is claimed is:

1. A method of manufacturing a light control element, comprising the steps of:

uniformly orienting a liquid crystal in a liquid layer consisting of liquid crystal mixed liquid prepared by mixing anisotropic gel with a liquid crystal by means of oriented film in contact with said liquid layer; and irradiating two light beams of coherence to said liquid layer to cure said anisotropic gel along an interference pattern formed by those two light beams.

2. A method of manufacturing a light control element, comprising the step of: irradiating two light beams of coherence onto liquid crystal mixed liquid prepared by mixing anisotropic gel with a liquid crystal to cause a crosslinking reaction along an interference pattern formed by those two light beams.

* * * * *